United States Patent [19]

Tronzano et al.

[11] Patent Number: 4,476,508
[45] Date of Patent: Oct. 9, 1984

[54] APPARATUS FOR RECORDING FLEXIBLE MAGNETIC DISKS

[75] Inventors: Sergio Tronzano, Caluso; Carlo Vignal, Romano, both of Italy

[73] Assignee: Ing. C. Olivetti & C., S.p.A., Ivrea, Italy

[21] Appl. No.: 320,874

[22] Filed: Nov. 12, 1981

[30] Foreign Application Priority Data

Nov. 14, 1980 [IT] Italy ................. 88742 A/80

[51] Int. Cl.³ ..................... G11B 5/55; G11B 21/08
[52] U.S. Cl. ..................................... 360/106; 360/97; 360/109; 74/89.2
[58] Field of Search ............................. 360/104–107, 360/97–99, 109; 74/89.2

[56] References Cited

U.S. PATENT DOCUMENTS 4,170,146 10/1979 Owens .................................. 74/89.2
4,366,722 1/1983 Hasler ............................... 360/106 X
4,399,477 8/1983 Bryer .................................. 360/106

FOREIGN PATENT DOCUMENTS 0060341 12/1981 European Pat. Off. ............ 360/106
2807856 6/1979 Fed. Rep. of Germany ...... 360/106

Primary Examiner—John H. Wolff
Attorney, Agent, or Firm—Banner, Birch, McKie & Beckett

[57] ABSTRACT

An apparatus for recording flexible magnetic disks contained in envelopes comprises a mandrel engageable with a central zone of the disk to rotate the disk within the envelope, and a carriage 41 which is movable radially relative to the disk and on which there is mounted a pair of magnetic heads which oppose each other and make contact with the magnetisable surfaces of the disk. The carriage 41 is moved on guides 48 by a stepping motor shaft 44 by way of a pair of flexible strips 50, 51 which are partly wound about a hub 59 on the shaft 44. The ends of the strips are retained by longitudinal pins 70 loosely fitted into an eccentric bore in the hub 59 without the aid of screws. Pegs 71 on the pins 70 pass through holes in the ends of the strips 50 and 51 and are arrested against the motor shaft 44. A presser pad, which presses the envelope containing the disk against a reference surface of the apparatus, is lowered by an electromagnet which also causes the upper head to lower. A lost-motion form of coupling enables the pad and upper head to carry out independently adjustable travel strokes, so minimising any recoil.

4 Claims, 5 Drawing Figures

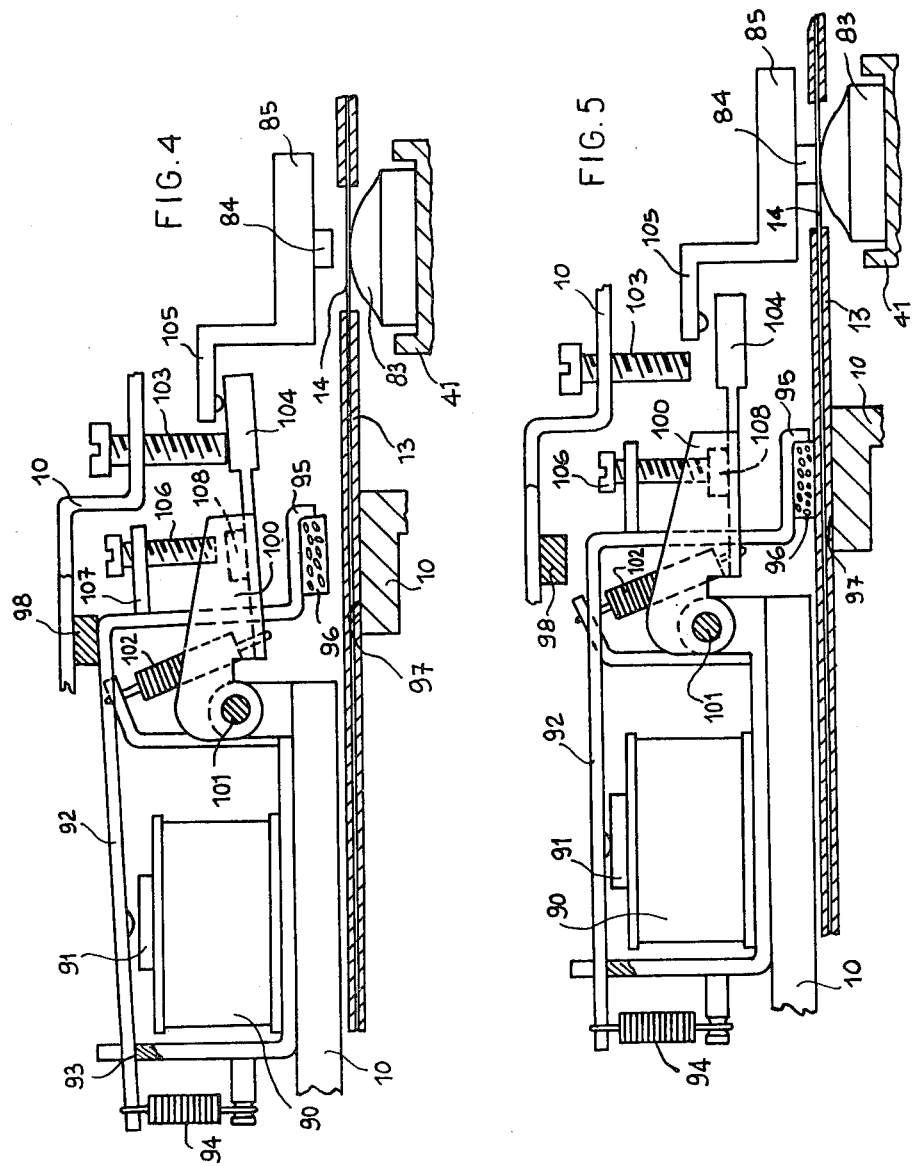

APPARATUS FOR RECORDING FLEXIBLE MAGNETIC DISKS

This invention relates to an apparatus for recording flexible magnetic disks contained in envelopes and commonly known as "floppy disks". This apparatus comprises a mandrel for rotating the disk within its envelope, a carriage movable radially relative to the disk and on which at least one magnetic head is mounted, and a motor which causes the carriage to move by way of a pair of flexible strips, each having one end connected to the carriage and the other end connected to the motor hub.

An apparatus is known in which, in order to convert the rotary motion of the motor into linear motion of the carriage, two flexible strips are used, one in the form of a U and the other of linear form so that it can be inserted between the arms of the U. The two strips are linked together at the hub, so that they partially wind about this latter and are kept constantly tangential to it. In this apparatus, each of the two strips is fixed to the hub by pins radial to the hub. Rubber washers are pressed on to the pins in order to correctly position and fix the strips relative to the pins. The use of these linked strips and this particular method of fixing to the hub is however complicated and costly. This is on account of the high precision with which the strips must be constructed and assembled. This is because dimensional or assembly errors lead to abnormal wear due to rubbing between the strips, and to the formation of folds due to misalignment between the strips and the direction of application of the force transmitted between the hub and the carriage.

A first object of the present invention is to provide an apparatus for recording flexible magnetic disks, in which the assembly of the strips which connect the head support carriage to the motor hub which controls the movement of this latter is simple, reliable and cheap.

The apparatus according to the invention according to a first aspect is defined in claim 1 below.

The apparatus may comprise a pair of mutually opposing magnetic heads mounted on the carriage, each to record and/or read a corresponding face of the disk, and a presser pad which presses the envelope against a reference surface. The envelope is flattened in proximity to the recording zone of the disk, and this positions the disk in a nominal working plane.

An apparatus of this type is known in which the presser pad is fixed directly to the movable armature of an electromagnet, and in which a tongue of the armature cooperates with one of the heads in order to withdraw it from the disk plane. The presser pad and the movable head have substantially equal travel strokes. This creates drawbacks because it is in contrast with the specific requirements of the presser which requires a long travel stroke, and of the head which requires a short travel stroke. In this respect, during the non-reading stages, the travel stroke of the presser pad when raised must be sufficiently long to ensure that the paid is well removed from the envelope, so as to prevent unnecessary disk wear. In contrast, the head must withdraw from the disk by only a very small distance, just sufficient to separate it from the magnetisable surface. Under such conditions, when the head is subsequently lowered, it does not land on the disk with too high a speed, and thus does not damage its magnetisable surface.

A second object of the present invention is to provide an apparatus in which a control electromagnet causes the presser pad and magnetic head to carry out independent and selectively adjustable strokes with minimum recoil, thus obviating the drawbacks of the known apparatus.

In accordance with this second object of the invention, the invention provides apparatus as defined in claim 8 below.

The present invention will be described in more detail, by way of example, with reference to the accompanying drawings, in which:

FIG. 4 is a partly sectional front view of a second detail of the apparatus of FIG. 1 in the rest position; and FIG. 5 is a front view of the detail of FIG. 4 in a working position.

Figure 1:
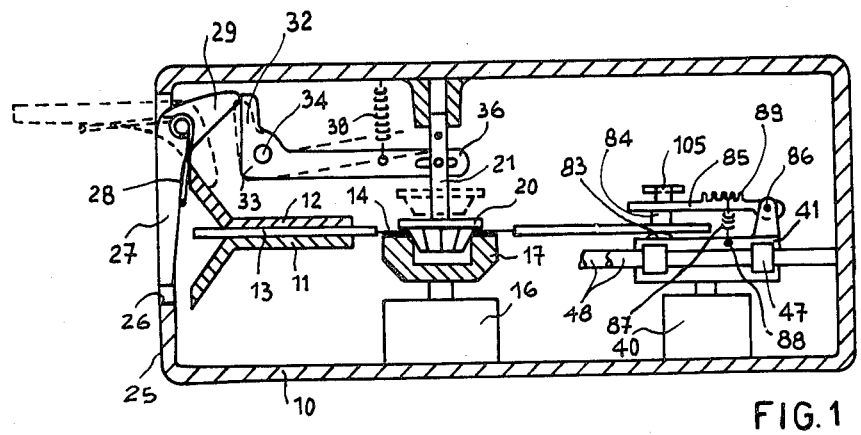
FIG. 1 is a diagrammatic partly sectional side view of an apparatus embodying the invention.

With reference to FIG. 1, the apparatus embodying the invention comprises a support frame 10, within which there is disposed a pair of substantially horizontal guides 11 and 12, between which an envelope 13 containing a flexible magnetic disk 14 of known type is to be inserted.

An electric motor 16, for example of the direct current type, is mounted on the frame 10 and is connected to a mandrel 17 which is arranged to cooperate with a central zone of the disk 14 in order to rotate this latter within its envelope 13. A counter-mandrel 20, also of known type, is rotatably mounted on a vertical shaft 21 coaxial to the mandrel 17, and is arranged to cooperate with the disk 14 in order to keep it pressed against the mandrel 17.

The front wall 25 (to the left in the figure) of the apparatus is provided with an aperture 26 through which the envelope 13 and disk 14 can be inserted between the guides 11 and 12.

A door 27, pivoted on a fixed pin 28, is movable between two stable positions, namely a working position and an insertion position respectively (this latter position is shown by dashed lines in the figure). A spring 30, located about the pin 28, tends to rotate the door 27 clockwise and to retain it in the insertion position. An arm 29 of the door 27 engages, in the manner of a cam, an arm 32 of an L lever 33 pivoted on a fixed pin 34 and having a second arm 36 connected to the spindle 21 of the counter-mandrel 20 by means of a pin-and-slot connection. A spring 38 tends to rotate the lever 33 in an anti-clockwise direction, and to keep the counter-mandrel 20 raised from the mandrel 17. The angle formed by the arm 29 and door 27 is greater than 90°, and the engagement between the arms 32 and 29 takes place on the same side of the spring 38 as the pins 28 and 34. Thus the spring 38 holds the door 27 in its closed working position.

Figure 2:
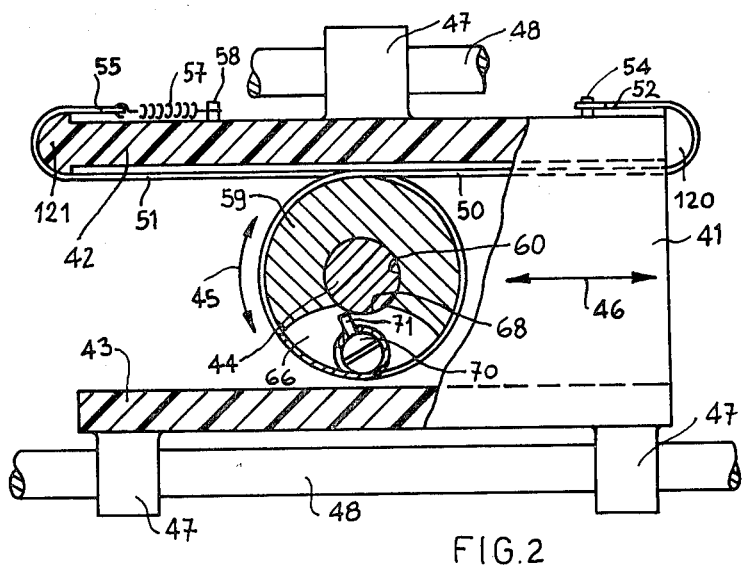
FIG. 2 is a partly sectional plan view of a detail of the apparatus of FIG. 1.

A reversible electric motor 40 of the stepping type is mounted on the frame 10 and is arranged to control the bi-directional movement of a carriage 41 radially to the disk 14. The carriage 41 is of plastics material and comprises two side pieces 42 and 43 (FIG. 2) between which an upper end of the drive shaft 44 of the motor 40 is arranged. The carriage 41 is slidable by way of lateral bushes 47 on horizontal guides 48 fixed on the frame 10.

Figure 3:
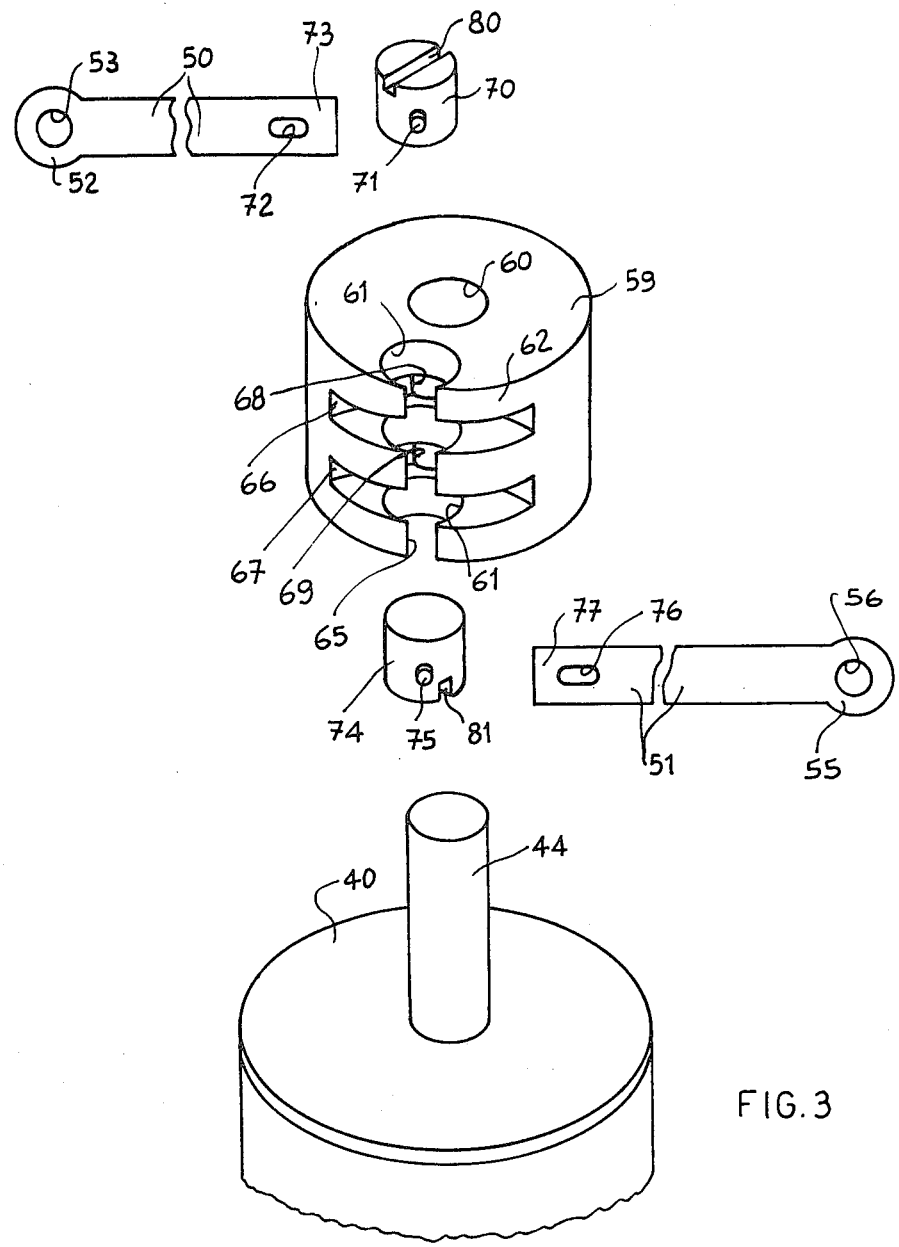
FIG. 3 is an exploded perspective view of certain parts of the detail of FIG. 2.

The transmission member which converts the rotary motion of the shaft 44 of the motor 40, indicated by the arrow 45, into bidirectional rectilinear motion of the carriage 41, indicated by the arrow 46, comprises a pair of very flexible metal strips 50 and 51 which are wound in a complementary manner through 360° about a cylindrical hub 59 fixed by a central bore 60 on to the drive shaft 44. The strips have first ends 52 and 44 respectively mounted on the carriage 42 and second ends 73 and 77 respectively mounted on the hub 59. More specifically, the end 52 of the strip 50 (FIGS. 2 and 3) is provided with a hole 53 into which there is inserted a pin 54 provided on the outside of the side piece 42 of the carriage 41. The end 55 of the strip 51 is provided with a hole 56 in which there is hooked the end of a spiral spring 57, the other end of which is hooked on to a pin 59 also provided on the outside of the side piece 42 of the carriage 41. Those parts of the two strips 50 and 51 adjacent to the ends 52 and 55 wrap through 180° about two substantially semicylindrical rounded edges 20 and 21, and are disposed parallel to the guides 48 along the inside of the side piece 42.

According to a further characteristic of the invention, the hub 59 is shaped to comprise an eccentric, axial through bore 61 of circular cross-section, which is parallel to the bore 60 and is formed tangential to, but with slight interference with, the peripheral surface 62 of the hub 59 so as to form a longitudinal slot 65 parallel to the cental bore 60. Two transverse channels 66 and 67 are provided in the hub 59 in two planes orthogonal to the axis of the bore 61, so as to form two internal slots 68 and 69 which connect the central bore 60 to the eccentric bore 61.

A longitudinal pin in the form of a cylinder 70 is loosely inserted in the top of the bore 61, and has a radial peg 71 which is loosely housed in a slot 72 provided in the end 73 of the strip 50, and also housed in the upper channel 66 of the hub 59.

A cylinder 74, matching the cylinder 70, is loosely inserted into the bottom of the bore 61, with its radial peg 75 loosely housed in a slot 76 in the end 77 of the strip 51 and also housed in the lower channel 67 of the hub 59. The axial dimensions of the two cylinders 70 and 74 are also such as to leave a gap between the respective lower and upper parts when the cylinders are both inserted into the bore 61, with the respective pins 71 and 75 housed in the channels 66 and 67.

The strips 50 and 51 are mounted on the hub 59 in the following manner. The cylinder 70 is firstly inserted into the top of the eccentric bore 61 so that its radial peg 71 is lined up in the longitudinal slot 65. When the cylinder 70 has completely entered the bore 61, its peg 71 is aligned with the channel 66 and faces outwards from the hub 59. The end 73 of the strip 50 is then inserted between the cylinder 70 and the innser surface of the bore 61, towards the right in FIG. 3, so that the peg 71 becomes housed in the slot 72. The cylinder 70 is then rotated in an anti-clockwise direction, for example by using a screwdriver slot 80, until the peg 71 passes beyond the internal slot 68.

The strip 51 is mounted in a like manner. The cylinder 74 is inserted into the bottom of the eccentric bore 61 so that the radial peg 75 lines up in the longitudinal slot 65. When the cylinder 74 has completely entered the bore 61, its peg 75 is aligned with the channel 67 and faces outwards from the hub 59. The end 77 of the strip 51 is then inserted between the cylinder 74 and the inner surface of the bore 61, towards the left in FIG. 3, so that the peg 75 becomes housed in the slot 76, the two strips 50 and 51 emerging from the slot 65 then being tangential to the peripheral surface of the hub 59 and facing opposite directions relative to the slot 65. The cylinder 74 is then rotated clockwise, for example using a screwdriver slot 81, until the peg 75 passes beyond the internal slot 69.

The hub 59 on which the strips 50 and 51 have been mounted in this manner is then placed on the upper end of the shaft 44 of the motor 40. This structure is now such that the clockwise rotation of the cylinder 70 and the anti-clockwise rotation of the cylinder 74 are limited by the stop action of the shaft 44 of the motor 40 against the pegs 71 and 75. The ends 52 and 55 of the strips 50 and 51 are finally fixed to the carriage 41 in the manner already described.

From the preceding description it is apparent that the strips 50 and 51 are mounted on the hub 59 in a simple, reliable and cheap manner. The strips thus mounted are subjected neither to mutual rubbing nor to the formation of folds, because as these strips are housed slackly between the respective cylinders 70 and 71 and the inner surface of the bore 61, they automatically adapt themselves to the direction of application of the force transmitted between the shaft of the motor 40 and the carriage 41.

Finally, the fact that the ends 73 and 77 are fixed to the pegs 71 and 75 beyond the curvature of the strips about the cylinders 70 and 74 means that the thrust of the pegs 71 and 75 against the slots 72 and 76 during the acceleration and braking stages of the carriage is reduced, so eliminating fracture of the strips 50 and 51 by fatigue.

The apparatus comprises a first magnetic head 83 (FIG. 1) mounted on the carriage 41 and arranged to contact the lower face of the disk 14, and a second magnetic head 84 mounted in a position opposing the lower head 83 on the end of an arm 85 pivoted on a pin 86 of the carriage 41 and arranged to contact the upper face of the disk 14.

According to a further aspect of the invention, a spring 87 is stretched between a fixed point 88 on the carriage 41 and one of five hooks 89 provided on the arm 85 at different distances from the pin 86, so that the force with which the upper head 84 is urged downwards can be adjusted and predetermined. For example, the spring 87 and the pitch between the hooks 89 are such as to exert a force of about 17 grams on the head 84 when the spring is hooked on to the central hook 89. On moving the spring 87 progressively on to the hook 89 further from or closer to the central pin, this force respectively increases or decreases by 1 gram, so allowing operation with the optimum force without it being necessary during manufacture to accurately select the loading of the spring 87, or alternatively making it possible to vary the working force on the head 84.

According to a further aspect of the invention, an electromagnet 90 (FIG. 4) is mounted on the frame 10 and comprises a fixed core 91 and a movable armature 92 pivoted on a fixed pint 93 and kept normally withdrawn from the core 92 by a spring 94. A presser pad 96, in the form of a sponge, is cemented to one end 95 of the armature 92, and is arranged to press the envelope 13 against a reference surface 97 of the frame 10 in order to define a nominal working plane for the disk 14 during its recording and reading. When at rest, the armature 92 rests against a fixed stop 98 on the frame 10.

A lever 100 pivoted on a fixed pin 101 is pulled by a spring 102 against an adjustable stop 103, constituted for example by a screw, and has one end 104 arranged to cooperate with a lug 105 of the arm 85, on which the upper head 84 is mounted. An adjustment screw 106, screwed in a lug 107 of the armature 92, is arranged to cooperate with a bent portion 108 of the lever 100.

The operation of the apparatus heretofore described is as follows. When in the rest state, without the disk inserted into the apparatus, the door 27 (FIG. 1) is in the raised insertion position, the counter-mandrel 20 is separated from the mandrel 17, the motors 16 and 40 are at rest, and the electromagnet 90 (FIG. 4) is de-energised. The upper head 84 is raised by the action of the spring 102 which holds the lever 100 against the screw 103. The distance of the upper head 84 from the lower head 83 can be adjusted by screwing the screw 103 to a greater or lesser extent into the frame 10.

It will now be assumed that it is required to record and/or read a flexible magnetic disk 14 contained in its envelope 13. After inserting the envelope 13 between the guides 11 and 12 (FIG. 1) through the front aperture 26, the door 27 is lowered into its working position shown in the figure. The arm 29 of the door 27 thus causes the lever 33 to rotate clockwise against the action of the spring 38, and moves the counter-mandrel 20 into the central bore in the disk 14, so centering this latter and pressing it against the mandrel 17.

The rotating motor 16 causes the disk 14 to rotate inside the envelope, which remains at rest. The carriage 41 is moved radially relative to the disk 14 by the motor 40 by way of the flexible strips 50 and 51, until the heads 83 and 84 are positioned on the required track of the disk on which it is intended to record and/or read binary data.

The electromagnetic 90 (FIG. 5) is energised, and the armature 92 is attracted against the core 91. The presser pad 96 thus presses the envelope 16 against the reference surrace 96. During the lowering of the armature 92, when the screw 106 encounters the bent portion 108 of the lever 100 this lever is also lowered, and the upper head 84 is left free to fall under the action of the spring 87. The travel path of the upper head 84 and its rest position relative to the head 83 can be adjusted by adjusting the screws 106 and 107 respectively. When recording and/or reading has taken place, the electromagnet 90 is de-energised so that the upper head 84 and the pad 96 return to their rest position. The motor 40 returns the carriage 41 to its rest position. On lifting the door 27, the counter-mandrel 20 is returned upwards, and the envelope 13 containing the disk 14 can be removed from the apparatus.

What we claim is:

1. An apparatus for recording and/or reading information on a magnetic disk, comprising means for rotating said disk, a carriage movable radially relative to said disk, a magnetic head mounted on said carriage, a cylindrical rotatable hub having a central axis and a cylindrical peripheral surface, means for defining a cylindrical bore in said rotatable hub, said cylindrical bore having an axis parallel to the central axis of said rotatable hub and being disposed eccentrically with respect to said central axis substantially tangential to said peripheral surface so as to define a lateral slot in said peripheral surface, parallel to said central axis, motor means for selectively rotating said cylindrical rotatable hub, two independent flexible strips each having a first end connectable to said carriage and a second end connectable to said cylindrical rotatable hub, and means for individually connecting the second end of each one of said two independent flexible strips to said cylindrical rotatable hub, said connecting means comprising two cylindrical pins coaxially inserted into said cylindrical bore, each one of said pins having a locking element cooperative with a corresponding second end of said two flexible strips, so that a portion of each one of said two flexible strips adjacent said second end is inserted into said cylindrical bore through said lateral slot and is wound on one of said two cylindrical pins inside said cylindrical bore.

2. An apparatus according to claim 2, wherein each said locking element comprises a stop peg which radially projects from the corresponding cylindrical pin, and wherein each second end of said two flexible strips has a hole which receives the corresponding stop peg.

3. An apparatus according to claim 2, wherein said motor means comprises a motor shaft and wherein said cylindrical rotatable hub further comprises a central bore for receiving said motor shaft and two transversal slots lying in planes perpendicular to said central axis, said central bore and said cylindrical bore communicating therebetween through said tranversal slots, each stop peg of said cylindrical pins being lodged inside one of said transversal slots and being stopped by said motor shaft.

4. An apparatus for recording and/or reading information on a magnetic disk, comprising means for rotating said disk, a carriage movable radially relative to said disk, a magnetic head mounted on said carriage, a cylindrical rotatable hub having a central axis and a cylindrical peripheral surface, means defining an axial through hole in said rotatable hub, means defining a cylindrical bore in said rotatable hub, said cylindrical bore having an axis parallel to the central axis of said rotatable hub and being disposed eccentrically with respect to said axial through hole substantially tangential to said peripheral surface so as to define a lateral slot in said peripheral surface parallel to said central axis, motor means including a motor shaft inserted into said axial through hole of said rotatable hub for selectively rotating said rotatable hub, two independent flexible strips each having a first end connectable to said carriage and a second end connectable to said cylindrical rotatable hub, and means for individually connecting the second end of each one of said two independent flexible strips to said cylindrical rotatable hub, said connecting means comprising two cylindrical pins coaxially inserted into said cylindrical bore, each one of said pins having a radial element cooperative with a corresponding second end of said two flexible strips, so that a portion of each one of said two flexible strips adjacent said second end is inserted into said cylindrical bore through said lateral slot and is wound on one of said two cylindrical pins inside said cylindrical bore, and the radial elements of said pins are lodged inside said tranversal slots and stopped by said motor shaft.

* * * * *